United States Patent
Sheffield et al.

(10) Patent No.: US 10,587,946 B2
(45) Date of Patent: Mar. 10, 2020

(54) HEADPHONE WITH ADAPTIVE CONTROLS

(71) Applicant: Skullcandy, Inc., Park City, UT (US)

(72) Inventors: Branden Sheffield, Saratoga Springs, UT (US); John Timothy, Salt Lake City, UT (US); Randall J. Hull, Park City, UT (US)

(73) Assignee: Skullcandy, Inc., Park City, UT (US)

( * ) Notice: Subject to any disclaimer, the term of this patent is extended or adjusted under 35 U.S.C. 154(b) by 0 days.

(21) Appl. No.: 15/832,527

(22) Filed: Dec. 5, 2017

(65) Prior Publication Data
US 2019/0174217 A1 Jun. 6, 2019

(51) Int. Cl.
*H04R 1/10* (2006.01)
*H04R 5/04* (2006.01)
*H04M 1/60* (2006.01)

(52) U.S. Cl.
CPC ......... *H04R 1/1041* (2013.01); *H04R 1/1008* (2013.01); *H04R 1/1091* (2013.01); *H04R 5/04* (2013.01); *H04M 1/6058* (2013.01); *H04M 1/6066* (2013.01); *H04R 1/1058* (2013.01); *H04R 2201/107* (2013.01); *H04R 2420/07* (2013.01); *H04R 2420/09* (2013.01)

(58) Field of Classification Search
CPC ............. H04R 2420/07; H04R 1/1041; H04R 1/1008; H04R 1/1058
USPC .................................................. 381/311, 77
See application file for complete search history.

(56) References Cited

U.S. PATENT DOCUMENTS

| | | | |
|---|---|---|---|
| 8,280,038 B2 | 10/2012 | Johnson et al. | |
| 9,756,414 B2 | 9/2017 | Pong et al. | |
| 2010/0284525 A1 | 11/2010 | Sander et al. | |
| 2016/0381451 A1* | 12/2016 | Pong ...................... | H04R 1/028 381/74 |

FOREIGN PATENT DOCUMENTS

GB 2502983 A 12/2013

OTHER PUBLICATIONS

Sennheiser ("Instruction Manual MM 550-X", pp. 1-29; Sennheiser Electronic GmbH & Co. Kg, Am Labor 1, 30900 Wedemark, Germany) Published Dec. 2011 (Year: 2011).*

(Continued)

*Primary Examiner* — Paul Kim
(74) *Attorney, Agent, or Firm* — TraskBritt

(57) ABSTRACT

A headphone that may be operated in either a wireless mode or a wired mode includes a housing and an acoustic driver within the housing. The headphone includes a jack for receiving a complementary jack at the end of an audio cable, and at least one control input. The at least one control input controls operation of the headphone when the headphone is operated in the wireless mode, and the at least one control input controls operation of an associated media device when the headphone is operated in the wired mode. A method of method of operating a headphone includes using at least one control input on a headphone to control operation of the headphone while using the headphone in a wireless mode, and using the at least one control input on the headphone to control operation of an associated media device while using the headphone in a wired mode.

20 Claims, 4 Drawing Sheets

(56) References Cited

OTHER PUBLICATIONS 3.5 mm Headset: Accessory Specification, https://source.android.com/devices/accessories/headset/plug-headset-spec; Apr. 10, 2017, 4 pages.
European Extended Search Report for European Application No. 18206385.9, dated Feb. 15, 2019, 8 pages.
European Communication pursuant to Article 94(3) EPC for European Application No. 18206385.9, dated Dec. 16, 2019, 4 pages.

\* cited by examiner

HEADPHONE WITH ADAPTIVE CONTROLS

TECHNICAL FIELD

The present disclosure relates to a headphone that can be operated in either a wired or wireless configuration, and to related methods of operating such as a headphone.

BACKGROUND

Wireless headphones receive an audio signal from a source media device, such as a phone, computer, tablet computer, television, gaming console, etc., and produce an audible acoustic sound output to the ear(s) of the user. Wireless headphones include a power source, such as a battery, since the power for driving the acoustic drivers (speakers) is not provided by the source media device providing the audio signal. Wireless headphones are commercially available in over-ear, on-ear, and in-ear configurations.

The audio signal is commonly provided to the headphones from the source media device using BLUETOOTH® technology, but other wireless communication protocols may also be employed, such as WiFi or infrared (IR) technology, for example.

Wireless headphones commonly include a power control input (e.g., a button) that is used to power the headphones on and off. The power control input is commonly also used to operationally pair the headphones with an associated media device that will provide an audio signal to the headphones by holding the actuation of the power control input for a relatively longer period of time than that used to power the headphones on and off. Wireless headphones may also include volume control input(s) for increasing and decreasing the volume of the audible acoustic sound output to the ear(s) of the user.

Due to the fact that wireless headphones are battery operated, wireless headphones have included a female headphone jack receptacle and a removable audio cable that may be used in the event that the battery is drained or in circumstances in which wireless operation may be prohibited, such as on an airplane, for example. The removable audio cable may include an inline module that includes a microphone and one or more control inputs, such as buttons, for providing input signals (e.g., a voice signal and/or operational control signals) to the media device (e.g., a smartphone) to which the headphone is attached.

For example, some removable audio cables include an inline module that includes a microphone and one control button. The control button may be used to control certain features of the media device to which the headphone is connected. For example, the media device may be a smartphone, and the control button may be used to answer and end phone calls, play or pause an audio signal, and skip forward or backward media files in a list of media files, depending on when and how the button is pressed. An inline module and an operational protocol configured for use with smartphones may run on an ANDROID® operating system or other operating system. Other inline modules for wired headphones may include more control inputs (e.g., three control inputs), which adds to the number of control operations that may be performed by the user.

DISCLOSURE

In some embodiments, the present disclosure includes a headphone that may be operated in either a wireless mode or a wired mode. The headphone includes a housing and an acoustic driver within the housing. The headphone further includes a jack for receiving a complementary jack at the end of an audio cable, and at least one control input. The at least one control input controls operation of the headphone when the headphone is operated in the wireless mode, and the at least one control input controls operation of an associated media device when the headphone is operated in the wired mode.

In yet further embodiments, the present disclosure includes methods of operating a headphone. In accordance with such methods, at least one control input on a headphone is used to control operation of the headphone while using the headphone in a wireless mode, and the at least one control input on the headphone is used to control operation of an associated media device while using the headphone in a wired mode.

DETAILED DESCRIPTION

Figure 1:
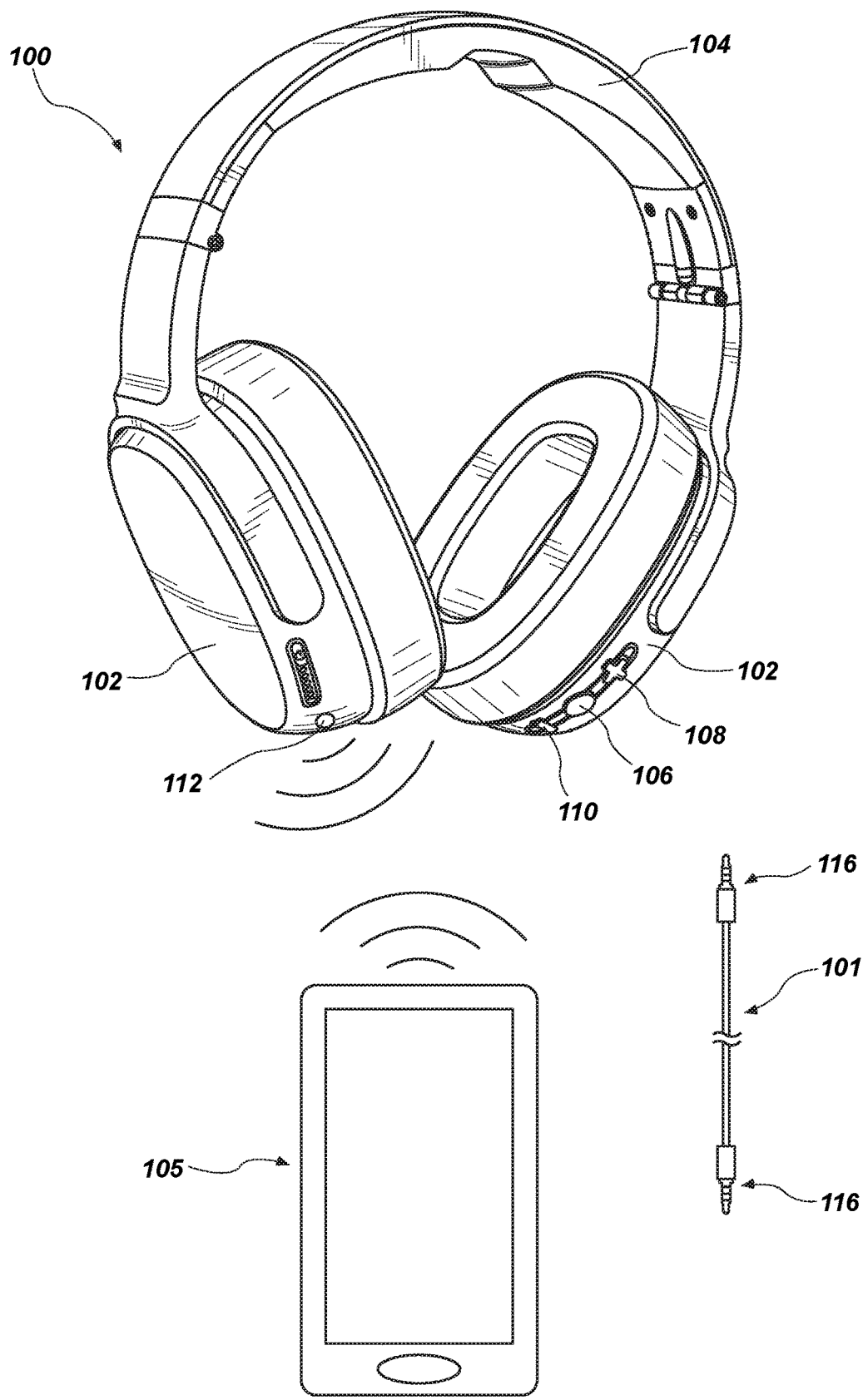
FIG. 1 illustrates an example of an embodiment of a headphone according to the present disclosure, an associated source media device wirelessly transmitting an audio signal to the headphone, and an optional audio cable that may be employed with the headphone and source media device.

In the following detailed description, reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In addition, some of the drawings may be simplified for clarity. Thus, the drawings may not depict all of the components of a headphone according to the present disclosure. In addition, like reference numerals may be used to denote like features throughout the specification and figures.

As used herein, the terms "operably couple," "operably coupled," "operably coupling," and other forms of the term "operably couple" refer to both wireless (e.g., BLUETOOTH®, WiFi, ZIGBEE®, etc.) and wired (e.g., electrical, optical, etc.) connections. "Operably couple," and its other forms may also refer to both direct (i.e., nothing coupled in between operably coupled components) and indirect (i.e., other components coupled in between operably coupled components) connections.

FIG. 1 illustrates an embodiment of a headphone 100 according to the present disclosure. The headphone 100 may be operated in either a wireless mode, as illustrated in FIG. 1, or in a wired mode using an optional audio cable 101. In the example embodiment illustrated in FIG. 1, the headphone 100 is an over-the-ear headphone, although the headphone 100 may be an in-ear headphone or an on-ear headphone in accordance with additional embodiments of the present disclosure. The headphone 100 includes two ear-cup assemblies 102, which are connected to one another by a headband 104. An acoustic driver (e.g., a speaker) is carried within each ear-cup assembly 102.

The headphone 100 may be characterized as a wireless headphone, and includes a power source, such as a battery, since the power for driving the acoustic drivers (speakers) is not provided by a source media device 105 providing the audio signal when the headphone is operated in the wireless mode. When operated in the wireless mode, the headphone 100 may be operably coupled (e.g., "paired") with a source media device 105, such as a smartphone, using BLUETOOTH® technology, but other wireless communication protocols may also be employed, such as WiFi or infrared (IR) technology, for example.

The headphone 100 includes at least one control input for controlling operation of the headphone 100 when the headphone 100 is operated in the wireless mode. As a non-limiting example, the at least one control input may include a power button 106 for powering the headphone 100 on and/or off when the headphone 100 is operated in the wireless mode. The power button 106 may also be used to initiate a pairing sequence with a source media device 105 by, for example, pressing and holding the power button 106. When the headphone 100 is powered on and playing an audio signal provided by an associated source media device 105, sequential pressing of the power button 106 may cause the source media device 105 to sequentially pause and then commence play of the audio signal. In the event the source media device 105 is a smartphone and the smartphone is receiving an incoming telephone call, pressing the power button 106 may cause the smartphone to answer the call, after which pressing the power button 106 may cause the smartphone to drop the call.

The at least one control input may also include an up/forward button 108, and a down/backward button 110. In the wireless mode of operation, pressing the up/forward button 108 may increase the volume of the headphone 100, while pressing the down/backward button 110 may decrease the volume of the headphone 100. Holding the up/forward button 108 while the headphone 100 is playing an audio signal may skip forward media files in a list of media files of an associated media device 105, while holding the down/backward button 110 while the headphone 100 is playing an audio signal may skip forward media files in a list of media files of an associated media device 105 in the wireless mode of operation.

The headphone 100 further includes a microphone 112. The microphone 112 may be used to generate an audio signal corresponding to the voice of the user for purposes of conducting telephone calls or conveying voice commands to the associated source media device 105. In the wireless mode of operation, the microphone 112 may receive power from the power source carried by the headphone 100, and the audio signal generated by the headphone may be conveyed to a microprocessor within the headphone 100, and then wirelessly to the source media device 105.

Figure 2:
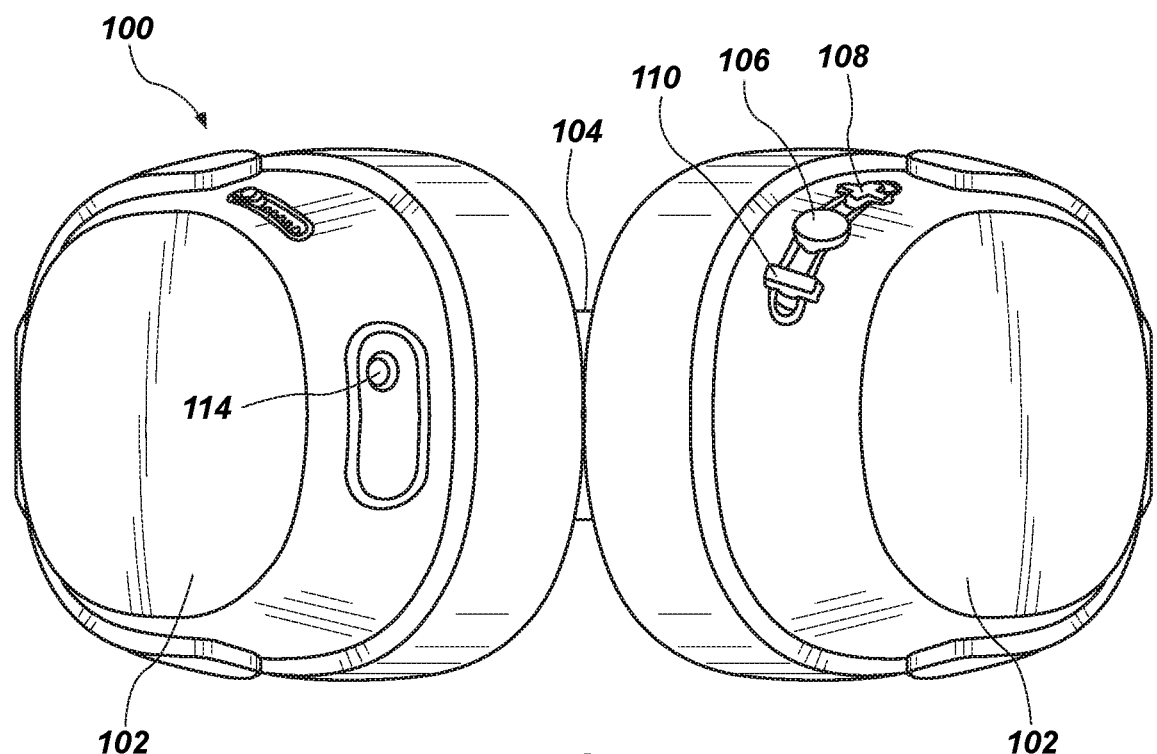
FIG. 2 is a bottom view of the headphone of FIG. 1 and illustrates a headphone jack receptacle on an earcup assembly of the headphone.

FIG. 2 is a bottom view of the headphone 100. As shown therein, the headphone 100 includes a jack 114 for receiving a complementary jack 116 at an end of the audio cable 101 of FIG. 1. The jack 114 may comprise a female receptacle sized and configured to receive a male jack, such as the male jack 116 of the audio cable. The jack 114 may include, for example, four conductive members, which are configured to couple with four electrically isolated conductive pathways extending through the audio cable 101 between the jacks 116 at the ends thereof.

Figure 3:
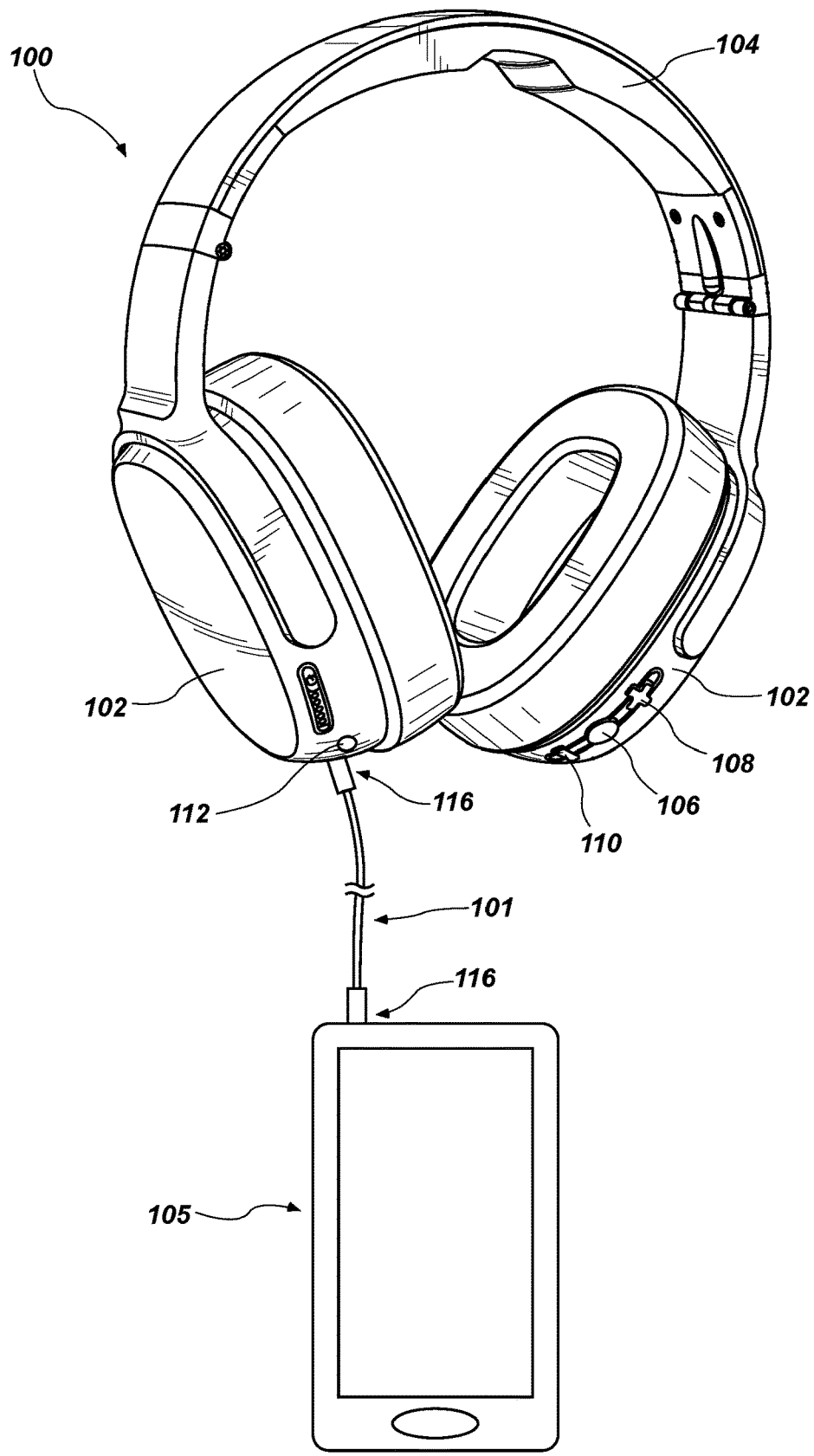
FIG. 3 illustrates a source media device transmitting an audio signal to the headphone of FIG. 1 through an audio cable.

Referring to FIG. 3, as previously mentioned, in the event the power source (e.g., battery) of the headphone 100 is drained, or the use of wireless communication protocols is prohibited, the headphone 100 may be used in a wired configuration by plugging one of the jacks 116 of the audio cable 101 into the jack 114 of the headphone 100, and the other jack 116 of the audio cable 101 into the source media device 105. The headphone 100 may be configured such that operation of the at least one control input (e.g., the power button 106, the up/forward button 108, and/or the down/backward button 110), and/or the microphone 112 is altered upon insertion of the jack 116 of the audio cable 101 into the jack 114 of the headphone 100.

In the wired mode of operation shown in FIG. 3, the at least one control input (e.g., the power button 106, the up/forward button 108, and/or the down/backward button 110) may be used to provide an input signal for controlling operation of the associated source media device 105. For example, upon plugging the jack 116 of the audio cable 101 into the jack 114 of the headphone 100, the electronic circuit of the headphone may be configured such that pressing the power button 106, the up/forward button 108, and/or the down/backward button 110 will generate a signal that is conveyed through one of the conductive members of the audio cable 101 to the source media device 105.

As a non-limiting example, when the headphone 100 is playing an audio signal provided by the associated source media device 105 in the wired mode of operation of FIG. 3, sequential pressing of the power button 106 may cause the source media device 105 to sequentially pause and then commence play of the audio signal. In the event the source media device 105 is a smartphone and the smartphone is receiving an incoming telephone call, pressing the power button 106 in the wired mode of operation may cause the smartphone to answer the call, after which pressing the power button 106 may cause the smartphone to drop the call.

In the wired mode of operation, pressing the up/forward button 108 may increase the volume of the headphone 100, while pressing the down/backward button 110 may decrease the volume of the headphone 100.

The operating system of the source media device 105 may dictate what operation is carried out upon receipt of a signal through the audio cable 101, and other operations may be performed by providing input signals to the source media device 105 through the audio cable 101 using the control inputs of the headphone 100.

Furthermore, in the wired mode of operation, the electrical circuit of the headphone 100 may be configured to supply power to the microphone 112 from the source media device 105 through the audio cable 101, and any voice signal generated by the microphone 112 may be conveyed to the source media device 105 through the audio cable 101.

As previously mentioned, in conventional wired headphones that are configured to provide input signals (e.g., a voice signal and a control signal) to a source media device 105 connected thereto, the audio cable includes an inline module that includes a microphone and one or more control inputs, such as buttons, for providing input signals (e.g., a voice signal and/or operational control signals) to the source media device. By utilizing the control inputs of the headphone 100 that are typically used for wireless operation of the headphone 100 to input signals to the source media device 105 when the jack 116 of the audio cable 101 is inserted into the jack 114 of the headphone 100, the inline module may be eliminated from the audio cable 101, which reduces snagging of the cable on clothing, etc., and reduces the cost of the audio cable 101.

Thus, as described herein, one or more of the control inputs (e.g., the power button 106, the up/forward button 108, and/or the down/backward button 110) may be used to control operation of the headphone 100 while using the headphone 100 in the wireless mode of operation without the audio cable 101, and the same one or more of the control inputs may be used to control operation of an associated source media device 105 when using the headphone 100 in the wired mode of operation. For example, the power button 106 may be used to power the headphone 100 on and off in the wireless mode of operation, and the power button 106 may be used to pause or play an audio signal of the source media device 105 in the wired mode of operation.

Figure 4:
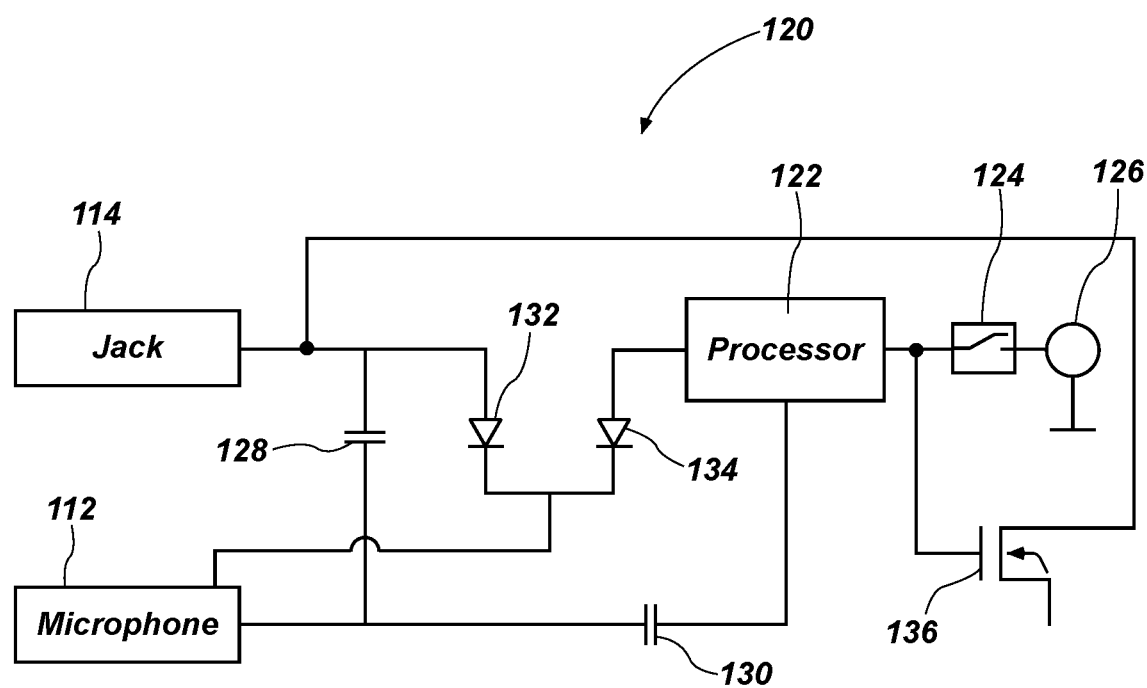
FIG. 4 is a circuit diagram of a portion of an embodiment of an electrical circuit that may be employed in the headphone of FIGS. 1-3 in accordance with the present disclosure.

FIG. 4 is a simplified circuit diagram of a portion of a first embodiment of an electrical circuit 120 that may be employed in the headphone of FIGS. 1-3 in accordance with the present disclosure. The electrical circuit 120 may provide the control logic configured to operate the headphone in either a wired mode or a wireless mode responsive to control inputs received indicating the presence or absence of the auxiliary cable.

The electrical circuit 120 includes processor 122 operably coupled with a multi-function button (MFB) 124 as well as the jack 114 and the microphone 112. The jack 114, the microphone 112, and/or the MFB 124 may be integrated into the housing of the headphone as discussed above. The MFB 124 may be coupled to a power source 126 (e.g., a battery), and be configured as a switch to provide power from the power source 126 to the processor 122 responsive to a user input. The MFB 124 may include at least one control input (e.g., the power button 106, the up/forward button 108, and/or the down/backward button 110) that controls various functions (e.g., power on/off, play, pause, forward, back, etc.) of the processor 122 as discussed above. The processor 122 may be any audio processor, digital signal processor, microprocessor, controller, microcontroller, system on a chip, state machine, or any processing device suitable for carrying out processes of the disclosure. In some embodiments, the processor 122 may be a BLUETOOTH® or other wireless enabled system on a chip configured to receive wireless signals when in wireless mode and perform audio processing for output to the speakers (not shown).

Audio from the microphone 112 may be transmitted to the jack 114 and/or the processor 122 for processing depending on the selected mode of operation. As a result, the microphone 112 may be reused and shared between the jack 114 (in wired mode) and the processor 112 (in wireless mode). Capacitors 128, 130 may be placed in the paths to protect processor 122 from the DC bias of the jack and protect the jack 114 from the DC bias of the processor 122, while still passing the audio signal to the processor 122 and/or the jack 114 for further processing.

The microphone 112 may also be powered via the processor 122 and/or the jack 114 depending on the mode. For example, a power path (e.g., via diode 132) may provide power from the source media device through the jack 114 when an auxiliary cable is connected. Another power path (e.g., via diode 134) may provide power from the processor 122. Whether the jack 114 and/or the processor 122 provides power to the microphone 112 may depend on the selected mode of operation for the headphone.

The electrical circuit 120 may further include an operation controller 136, which may be implemented with a transistor switch that receives a control input from the MFB 124. Other elements may also be employed, such as diodes or other devices. The operation controller 136 may be controllable by the MFB 136 to provide the control functions of the MFB 124 when an auxiliary cable is inserted into the jack 114. When enabled, the transistor may be conducting in the path to the jack 114. When disabled, the transistor may be not be conducting in the path to the jack 114.

In wired mode, the auxiliary cable may be inserted into the headphone through the jack 114. As a result, audio may be transmitted through the jack 114 to the processor 122 (e.g., via the path through capacitors 128, 130), and power may be provided by the source media device through the jack 114 to the microphone 112 (e.g., via the path through diode 132). In addition, the MFB 124 may trigger the operation controller 136 such that the functionality of the MFB 124 (e.g., play, pause, etc.) may be passed through the auxiliary cable when in wired mode. In addition, the wireless communication capabilities of the processor 122 may be disabled (e.g., in software) responsive to an input such that the processor 122 does not wirelessly communicate with the with the source media device.

In wireless mode, wireless communication capabilities of the processor 122 may be enabled (e.g., in software) responsive to an input such that the processor 122 may be configured to receive a wireless communication with the source media device (e.g., a BLUETOOTH® connection to an electronic device). In addition, the operation controller 136 may be enabled. In addition, power may be provided through the processor 122 to the microphone 112 (e.g., via the path through diode 134). The MFB 124 may trigger the processor 122 such that the functionality of the MFB 124 (e.g., power on/off, play, pause, forward, back, etc.) may be passed through the processor 122 and communicated to the source media device wirelessly. It is noted that the MFB 124 may also trigger the operation controller 136 coupled to the jack 114; however, without an auxiliary cable connected such a connection may not provide any functionality during wireless mode. In some embodiments, an additional circuit (not shown) may be included to actively disable the operation controller 136 from affecting the jack 114 when in wireless mode.

Additional non-limiting example embodiments of the present disclosure are set forth below:

Embodiment 1: a headphone that may be operated in either a wireless mode or a wired mode, comprising: a housing; an acoustic driver within the housing; a jack for receiving a complementary jack at the end of an audio cable; and at least one control input, the at least one control input controlling operation of the headphone when the headphone is operated in the wireless mode, the at least one control input controlling operation of an associated media device when the headphone is operated in the wired mode.

Embodiment 2: the headphone of Embodiment 1, wherein the headphone is an over-ear or on-ear headphone.

Embodiment 3: the headphone of Embodiment 1, wherein the headphone is an in-ear headphone.

Embodiment 4: the headphone of any one of Embodiments 1 through 3, wherein the jack comprises a female receptacle.

Embodiment 5: the headphone of any one of Embodiments 1 through 4, wherein the at least one control input comprises a button.

Embodiment 6: the headphone of any one of Embodiments 1 through 5, wherein the at least one control input powers the headphone on and/or off when the headphone is operated in the wireless mode.

Embodiment 7: the headphone of any one of Embodiments 1 through 6, wherein the at least one control input may be used to answer and/or drop a telephone call of an associated media device when the headphone is operated in the wired mode.

Embodiment 8: the headphone of any one of Embodiments 1 through 7, wherein the at least one control input may be used to play and/or pause an audio signal of an associated media device when the headphone is operated in the wired mode.

Embodiment 9: the headphone of any one of Embodiments 1 through 8, wherein the at least one control input may be used to skip forward and/or skip backward media files in a list of media files of an associated media device when the headphone is operated in the wired mode.

Embodiment 10: the headphone of any one of Embodiments 1 through 9, further comprising a microphone for generating another audio signal that may be transmitted from the headphone to an associated media device.

Embodiment 11: the headphone of Embodiment 10, wherein the headphone is configured to transmit the another audio signal to an associated media device wirelessly when the headphone is operated in the wireless mode; and transmit the another audio signal to the associated media device through the audio cable when the headphone is operated in the wired mode.

Embodiment 12: the headphone of Embodiment 10 or 11, wherein the headphone is configured to: provide power to the microphone from an internal power source of the headphone when the headphone is operated in the wireless mode; and provide power to the microphone from the associated media device through the audio cable when the headphone is operated in the wired mode.

Embodiment 13: a method of operating a headphone, comprising: using at least one control input on a headphone to control operation of the headphone while using the headphone in a wireless mode; and using the at least one control input on the headphone to control operation of an associated media device while using the headphone in a wired mode.

Embodiment 14: the method of Embodiment 13, wherein using at least one control input on a headphone to control operation of the headphone while using the headphone in a wireless mode comprises powering the headphone on and/or off.

Embodiment 15: the method of Embodiment 13 or 14, wherein using the at least one control input on the headphone to control operation of an associated media device while using the headphone in a wired mode comprises answering and/or dropping a telephone call of an associated media device.

Embodiment 16: the method of any one of Embodiments 13 through 15, wherein using the at least one control input on the headphone to control operation of an associated media device while using the headphone in a wired mode comprises playing and/or pausing an audio signal of an associated media device.

Embodiment 17: the method of any one of Embodiments 13 through 16, wherein using the at least one control input on the headphone to control operation of an associated media device while using the headphone in a wired mode comprises skipping forward and/or skipping backward media files in a list of media files of an associated media device.

What is claimed is:

1. A headphone that may be operated in either a wireless mode or a wired mode, comprising:
    a housing;
    an acoustic driver within the housing;
    a jack for receiving a complementary jack at an end of an audio cable;
    at least one control input; and
    control circuitry configured to:
        control a function of the headphone in response to a first input received at the at least one control input, while the headphone is operated in a wireless mode based at least in part on the complementary jack not being received in the jack; and
        control a function of the associated media device in response to a second input received at the at least one control input, while the headphone is operated in a wired mode based at least in part on the complementary jack being received in the jack.

2. The headphone of claim 1, wherein the headphone is an over-ear or on-ear headphone.

3. The headphone of claim 1, wherein the headphone is an in-ear headphone.

4. The headphone of claim 1, wherein the jack comprises a female receptacle.

5. The headphone of claim 1, wherein the at least one control input comprises a button.

6. The headphone of claim 1, wherein the function of the headphone comprises powering the headphone on and/or off.

7. The headphone of claim 6, wherein the function of the associated media device comprises answering and/or ending a telephone call of the associated media device.

8. The headphone of claim 7, wherein the function of the associated media device comprises playing and/or pausing an audio signal of the associated media device.

9. The headphone of claim 8, wherein the function of the associated media device comprises skipping forward and/or skipping backward media files in a list of media files of the associated media device.

10. The headphone of claim 1, wherein the function of the associated media device comprises answering and/or ending a telephone call of the associated media device.

11. The headphone of claim 1, wherein the function of the associated media device comprises playing and/or pausing an audio signal of the associated media device.

12. The headphone of claim 1, wherein the function of the associated media device comprises skipping forward and/or skipping backward media files in a list of media files of the associated media device.

13. The headphone of claim 1, further comprising a microphone for generating another audio signal that may be transmitted from the headphone to an associated media device.

14. The headphone of claim 13, wherein the control circuitry is further configured to:
    transmit the another audio signal to the associated media device wirelessly while the headphone is operated in the wireless mode; and
    transmit the another audio signal to the associated media device through the audio cable while the headphone is operated in the wired mode.

15. The headphone of claim 13, wherein the control circuitry is configured to:
provide power to the microphone from an internal power source of the headphone while the headphone is operated in the wireless mode; and
provide power to the microphone from the associated media device through the audio cable while the headphone is operated in the wired mode.

16. A method of operating a headphone, comprising:
controlling a function of a headphone in response to a first input received at an at least one control input of the headphone, while the headphone is operated in a wireless mode based at least in part on a complementary jack not being received in a jack of the headphone; and
controlling a function of the associated media device in response to a second input received at the at least one control input, while the headphone is operated in a wired mode based at least in part on the complementary jack being received in the jack, wherein the complementary jack is coupled to an associated media device.

17. The method of claim 16, wherein the function of the headphone comprises powering the headphone on and/or off.

18. The method of claim 17, wherein the function of associated media device comprises answering and/or ending a telephone call of the associated media device.

19. The method of claim 17, wherein the function of the associated media device comprises playing and/or pausing an audio signal of the associated media device.

20. The method of claim 17, wherein the function of the associated media device comprises skipping forward and/or skipping backward media files in a list of media files of the associated media device.

* * * * *